United States Patent [19]

Sassler

[11] 3,902,126

[45] Aug. 26, 1975

[54] SINGLE SIDEBAND GENERATOR

[75] Inventor: Marvin Lawrence Sassler, Wayne, N.J.

[73] Assignee: International Telephone and Telegraph Corporation, Nutley, N.J.

[22] Filed: May 29, 1974

[21] Appl. No.: 474,291

[52] U.S. Cl. .................. 328/61; 307/228; 307/265; 307/271; 325/137; 328/147; 328/158; 332/45

[51] Int. Cl.[2] ...................... H03K 1/00; H03K 1/16; G01R 11/02

[58] Field of Search ........... 307/228, 235, 265, 271; 328/14, 60, 61, 146, 147, 156–158, 178, 181; 325/137, 138; 332/44, 45

[56] References Cited

UNITED STATES PATENTS

| | | | |
|---|---|---|---|
| 3,201,611 | 8/1965 | Mollinga | 307/228 |
| 3,287,505 | 11/1966 | Fukamachi | 307/228 |
| 3,740,588 | 6/1973 | Stratton et al. | 328/61 |
| 3,840,814 | 10/1974 | Schiffman | 328/61 |

*Primary Examiner*—Stanley D. Miller, Jr.
*Attorney, Agent, or Firm*—John T. O'Halloran; Menotti J. Lombardi, Jr.; Hill, Alfred C.

[57] ABSTRACT

There is disclosed a single sideband generator that provides as its output a selected one of two sidebands and rejects the unselected sideband and the carrier. Two triangular waveforms each having a different frequency are applied as inputs to a voltage comparator to produce a first pulse train of linearly increasing and then linearly decreasing duty cycle. Edge selection logic circuitry under control of a square wave waveform selects predetermined edges of the first pulse train relative to the negative and positive slopes of the triangular waveform having the lower frequency. The selected edges trigger a monostable multivibrator to produce a second pulse train having a repetition frequency equal to the upper sideband or lower sideband depending upon the polarity of the square wave waveform.

10 Claims, 3 Drawing Figures

SINGLE SIDEBAND GENERATOR

BACKGROUND OF THE INVENTION

This invention relates to single sideband generators, and more particularly to single sideband generators that produce only one of two sidebands while rejecting the other sideband and the carrier.

Single sideband generators of the prior art utilize filters or phase shifters to reject or cancel the undesired sideband and the carrier. Disadvantages of these prior art single sideband generators are that the filters and phase shifters are bulky and heavy, that they limit the bandwidth of the generator, that they are vibration sensitive and that they are not suitable to implementation by integrated circuit techniques.

SUMMARY OF THE INVENTION

An object of the present invention is to provide an improved single sideband generator overcoming the disadvantages of the prior art.

Another object of the present invention is to provide a single sideband generator that does not employ filters or phase shifters.

Still another object of the present invention is to provide a single sideband generator suitable for implementation by integrated circuit techniques.

A feature of the present invention is the provision of a single sideband generator to generate a selected one of the upper sideband and the lower sideband and to reject the carrier and the unselected sideband comprising; a first source of a first linear triangular waveform having a first given frequency, a given peak-to-peak amplitude, a positive slope and a negative slope; a second source of a second linear triangular waveform having a second given frequency greater than the first given frequency, a peak-to-peak amplitude equal to the given amplitude, a positive slope and a negative slope; first means coupled to the first and second sources to compare the amplitudes of the first and second triangular waveforms and to produce a first pulse train of linearly increasing and then linearly decreasing duty cycle, each pulse of the first pulse train having a rising edge and a falling edge; second means coupled to the first means to select one of the rising edge and the falling edge of the pulses of the first pulse train during the positive slope of the first triangular waveform and to select the other of the rising and falling edges of the pulses of the first pulse train during the negative slope of the first triangular waveform; and a monostable device coupled to the second means to provide a second pulse train having a repetition frequency equal to only one of the upper and lower sidebands depending upon the edges selected by the second means during the positive and negative slopes of the first triangular waveform.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
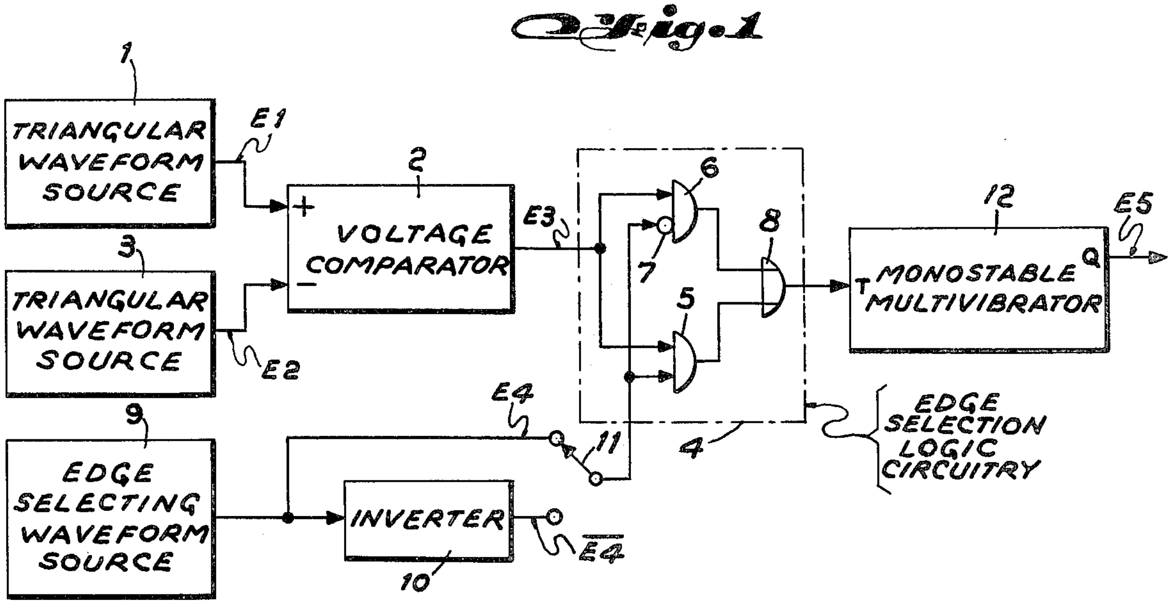
FIG. 1 is a block diagram of a single sideband generator in accordance with the principles of the present invention.
Figure 2:
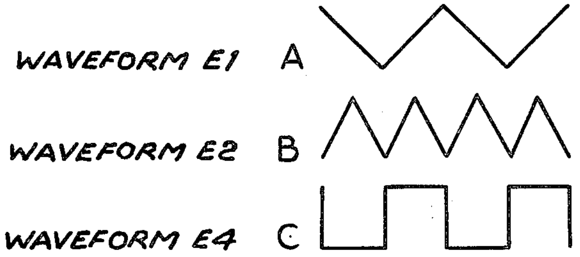
FIG. 2 is a set of curves illustrating waveforms that appear at various points in the circuit of FIG. 1.
Figure 3:
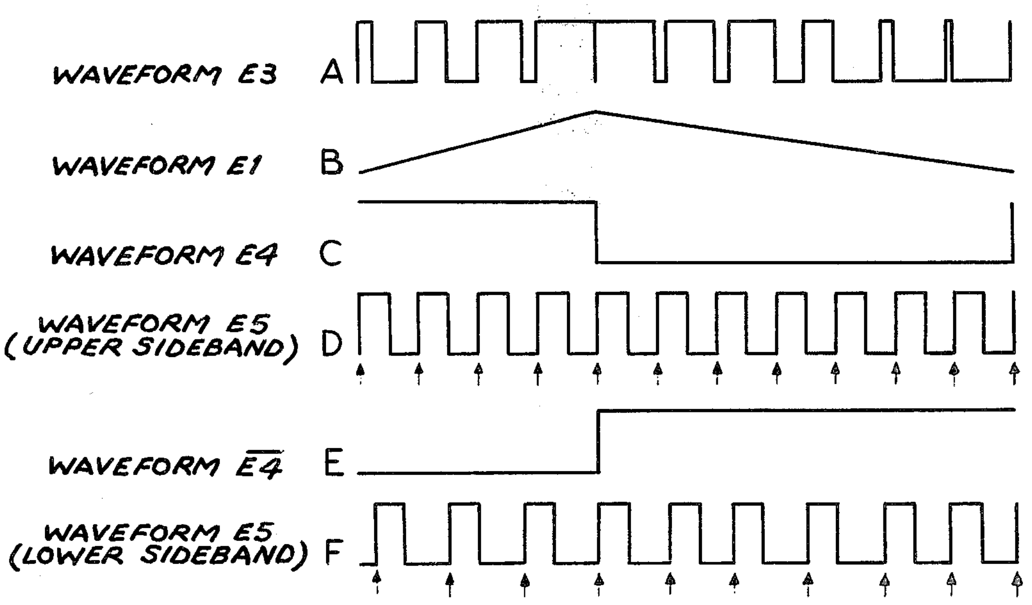
FIG. 3 is a set of curves illustrating waveforms at various points in the circuit of FIG. 1 useful in explaining the operation of the circuit of FIG. 1.

Referring to FIGS. 1, 2 and 3, a low frequency linear triangular waveform E1 from source 1 is applied to the positive input of voltage comparator 2. The waveform E1 is illustrated in Curve A, FIG. 2. Source 3 provides a linear triangular waveform E2 having a higher frequency than waveform E1. Waveform E2 is illustrated in Curve B, FIG. 2. Waveform E2 is coupled to the negative input of voltage comparator 2. The triangular waveforms from sources 1 and 3 must have the same peak-to-peak amplitude. The operation of voltage comparator 2 produces a first pulse train of linearly increasing and then linearly decreasing duty cycle as shown in Curve A, FIG. 3.

The waveform E3 is coupled to edge selection logic circuitry 4 including AND gate 5, INHIBIT gate 6 with an inhibit terminal 7 and OR gate 8. Logic circuitry 4 operates under control of a selecting waveform from either source 9 or inverter 10 coupled to source 9 through the proper actuation of switch 11. Circuitry 4 selects one of the rising and falling edges of the first pulse train during the positive slope of waveform E1 and the other of the rising and falling edge of the pulses of the first pulse train during the negative slope of waveform E1 depending upon whether switch 11 coupled waveform E4 shown in Curve C, FIG. 2 and Curve C, FIG. 3, or waveform $\overline{E4}$ shown in Curve E, FIG. 3 to circuitry 4. It should be noted that waveform E4 and its inverted version thereof $\overline{E4}$ has a repetition frequency equal to the repetition frequency of the lower frequency triangular waveform E1 as seen in FIG. 2. The selected pulse edges are coupled to the trigger input of monostable multivibrator 12 to produce a second pulse train having a repetition frequency equal to either the upper sideband frequency or the lower sideband frequency depending upon whether circuitry 4 is controlled by waveform E4 or $\overline{E4}$.

Switch 11 has been shown as a manual switch, but it is well known that such a switch can be implemented by an electronic switch which would be the preferred implementation herein in accordance with the principles of the present invention.

The circuitry of FIG. 1 operates as follows. First consider the condition when waveform E4, Curve C, FIG. 3 controls circuitry 4. The period between rising edges of waveform E3, Curve A, FIG. 3, passed by AND gate 5 during the positive slope of waveform E1, Curve B, FIG. 3 and the falling edges of waveform E3 passed by INHIBIT gate 6 during the negative slope of E1 is proportional to the upper sideband frequency. Under these conditions multivibrator produces a resultant output pulse train E5, Curve D, FIG. 3 having a repetition frequency equal to the frequency of the upper sideband.

The lower sideband is produced by controlling circuitry 4 with waveform $\overline{E4}$. The period between the falling edges during the positive slope of waveform E1, Curve B, FIG. 3 and the rising edges of waveform E3 during the negative slope of waveform E1 is proportional to the lower sideband frequency. Again, AND gate 5 passes the rising edges of the pulses of waveform E3 and the INHIBIT gate 6 passes the falling edges of the pulses of waveform E3 when under control of waveform $\overline{E4}$. The output E5 having a repetition frequency equal to the frequency of the lower sideband is shown in Curve F, FIG. 3.

The chief advantages of the single sideband generator of the present invention are: (1) no filter or phase shifter is required, (2) has a wideband operation, (3) can be electronically controlled by switch 11 to produce upper or lower sideband output, (4) can switch rapidly from upper to lower sideband output, (5) can be used to shift a carrier signal by minute amounts and (6) can be implemented using standard digital integrated circuits.

The single sideband generator of the present invention may have utility in the following: (1) frequency synthesizers, expecially of the miniature variety since no jitter is present, (2) voltage controlled crystal oscillators with very stable rest frequencies and large linear pull ranges, (3) special frequency converters requiring small frequency offset and (4) frequency shift keyed modulators with rapid switching time.

While I have described above the principles of my invention in connection with specific apparatus it is to be clearly understood that this description is made only by way of example and not as a limitation to the scope of my invention as set forth in the objects thereof and in the accompanying claims.

I claim:

1. A single sideband generator to generate a selected one of the upper sideband and the lower sideband and to reject the carrier and the unselected sideband comprising;

a first source of a first linear triangular waveform having a first given frequency, a given peak-to-peak amplitude, a positive slope and a negative slope;

a second source of a second linear triangular waveform having a second given frequency greater than said first given frequency, a peak-to-peak amplitude equal to said given amplitude, a positive slope and a negative slope;

first means coupled to said first and second sources to compare the amplitudes of said first and second triangular waveforms and to produce a first pulse train of linearly increasing and then linearly decreasing duty cycle, each pulse of said first pulse train having a rising edge and a falling edge;

second means coupled to said first means to select one of said rising edge and said falling edge of said pulses of said first pulse train during said positive slope of said first triangular waveform and to select the other of said rising and falling edges of said pulses of said first pulse train during said negative slope of said first triangular waveform; and a monostable device coupled to said second means to provide a second pulse train having a repetition frequency equal to only one of said upper and lower sidebands depending upon said edges selected by said second means during said positive and negative slopes of said first triangular waveform.

2. A generator according to claim 1, wherein said first means includes a voltage comparator having an output, a positive input coupled to said first source and a negative input coupled to said second source.

3. A generator according to claim 2, wherein said second means includes logic circuitry coupled to said output of said voltage comparator, a third source of a square wave waveform having a repetition frequency equal to said first given frequency and a positive polarity during said positive slope of said first triangular waveform, said third source being selectively coupled to said logic circuitry, said square wave waveform controlling said logic circuitry to select said rising edge of said pulses of said first pulse train during said positive slope of said first triangular waveform and said falling edge of said pulses of said first pulse train during said negative slope of said first triangular waveform and thereby provide said second pulse train with a repetition frequency equal to said upper sideband, an inverter coupled to said third source to invert said square wave waveform, said inverter being selectively coupled to said logic circuitry, said inverted square wave waveform having a positive polarity during said negative slope of said first triangular waveform, said inverted square wave waveform controlling said logic circuitry to select said falling edge of said pulses of said first pulse train during said positive slope of said first triangular and said rising edge of said pulses of said first pulse train during said negative slope of said first triangular waveform and thereby provide said second pulse train with a repetition frequency equal to said lower sideband, and a switching device coupled to said logic circuitry and selectively coupled to said third source and said inverter to couple a selected one of said third source and said inverter to said logic circuitry.

4. A generator according to claim 1, wherein said logic circuitry includes an AND gate having an output, a first input coupled to said output of said voltage comparator and a second input coupled to said switching device, an INHIBIT gate having an output, a first input coupled to said output of said voltage comparator and an inhibit input coupled to said switching device, and an OR gate having an output coupled to said monostable device, a first input coupled to said output of said AND gate and a second input coupled to said output of said INHIBIT gate.

5. A generator according to claim 4, wherein said monostable device is a monostable multivibrator.

6. A generator according to claim 1, wherein said second means includes logic circuitry coupled to said first means, a third source of a square wave waveform having a repetition frequency equal to said first given frequency and a positive polarity during said positive slope of said first triangular waveform, said third source being selectively coupled to said logic circuitry, said square wave waveform controlling said logic circuitry to select said rising edge of said pulses of said first pulse train during said positive slope of said first triangular waveform and said falling edge of said pulses of said first pulse train during said negative slope of said first triangular waveform and thereby provide said second pulse train with a repetition frequency equal to said upper sideband, an inverter coupled to said third source to invert said square wave waveform, said inverter being selectively coupled to said logic circuitry, said inverted square wave waveform having a positive polarity during said negative slope of said first triangular waveform, said inverted square wave waveform controlling said logic circuitry to select said falling edge of said pulses of said first pulse train during said positive slope of said first triangular and said rising edge of said pulses of said first pulse train during said negative slope of said first triangular waveform and thereby provide said second pulse train with a repetition frequency equal to said lower sideband, and a switching device coupled to said logic circuitry and selectively coupled to said third source and said inverter to couple a selected one of said third source and said inverter to said logic circuitry.

7. A generator according to claim 6, wherein said logic circuitry includes an AND gate having an output, a first input coupled to said first means and a second input coupled to said switching device, an INHIBIT gate having an output, a first input coupled to said first means and an inhibit input coupled to said switching device, and an OR gate having an output coupled to said monostable device, a first input coupled to said output of said AND gate and a second input coupled to said output of said INHIBIT gate.

8. A generator according to claim 7, wherein said monostable device is a monostable multivibrator.

9. A generator according to claim 1, wherein said second means includes third means to control the selection operation of said second means, an AND gate having an output, a first input coupled to said first means and a second input coupled to said third means, an INHIBIT gate having an output, a first input coupled to said first means and an inhibit input coupled to said third means, and an OR gate having an output coupled to said monostable device, a first input coupled to said output of said AND gate and a second input coupled to said output of said INHIBIT gate.

10. A generator according to claim 9, wherein said monostable device is a monostable multivibrator.

* * * * *